(12) United States Patent
Park et al.

(10) Patent No.: US 8,683,385 B2
(45) Date of Patent: Mar. 25, 2014

(54) MOBILE TERMINAL AND METHOD OF DISPLAYING MENU THEREOF

(75) Inventors: Won Joo Park, Gwacheon-si (KR); Hyung Min Yook, Seoul (KR); Min Suk Jang, Anyang-si (KR); Mi Jung Park, Hwaseong-si (KR); Keun Young Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1129 days.

(21) Appl. No.: 12/244,532

(22) Filed: Oct. 2, 2008

(65) Prior Publication Data

US 2009/0106702 A1    Apr. 23, 2009

(30) Foreign Application Priority Data

Oct. 17, 2007  (KR) ........................ 10-2007-0104709

(51) Int. Cl.
*G06F 3/048* (2013.01)

(52) U.S. Cl.
USPC ........... 715/841; 715/784; 715/786; 715/830; 715/853

(58) Field of Classification Search
USPC .......................... 715/841, 784, 786, 830, 853
See application file for complete search history.

(56) References Cited

U.S. PATENT DOCUMENTS

| 6,252,597 | B1* | 6/2001 | Lokuge ......................... 715/841 |
| 6,448,985 | B1 | 9/2002 | McNally |
| 7,404,152 | B2* | 7/2008 | Zinn et al. ..................... 715/864 |
| 2004/0100479 | A1 | 5/2004 | Nakano et al. |
| 2005/0125147 | A1 | 6/2005 | Mueller |

FOREIGN PATENT DOCUMENTS

WO    2006/101507    9/2006

OTHER PUBLICATIONS

European Search Report of EP Patent Application No. 08 16 5255 dated Dec. 22, 2011.
Communication issued by the European Patent Office pursuant to Article 94(3) of the European Patent Convention in European Patent Application No. 08165255.4 dated Jun. 3, 2013.

* cited by examiner

*Primary Examiner* — Andrey Belousov

(74) *Attorney, Agent, or Firm* — H.C. Park & Associates, PLC

(57) ABSTRACT

A mobile terminal and a method of displaying a menu thereof are provided. The method includes displaying a list of upper-level menus in an order on a display screen, displaying a first upper-level menu at an upper end of the display panel, a second upper-level menu that is next to the first upper-level menu in the order at a lower end of the display screen, and lower-level menus of the first upper-level menu in a list between the first upper-level menu and the second upper-level menu in response to selection of the first upper-level menu from the list of upper-level menus, and executing a selected lower-level menu in response to selection of one of the lower-level menus.

16 Claims, 12 Drawing Sheets

MOBILE TERMINAL AND METHOD OF DISPLAYING MENU THEREOF

CROSS REFERENCE TO RELATED APPLICATION

This application claims priority from and the benefit of Korean Patent Application No. 10-2007-0104709, filed on Oct. 17, 2007, which is hereby incorporated by reference for all purposes as if fully set forth herein.

BACKGROUND OF THE INVENTION

1. Field of the Invention

The present invention relates to a mobile terminal and a method of displaying a menu thereof, and more particularly, to a mobile terminal and a method of displaying a menu thereof that hierarchically manages data by grouping the data in a menu.

2. Discussion of the Background

Nowadays, as mobile terminals are more widely used, various functions are added to the mobile terminal to enable the mobile terminal to perform complex functions. That is, mobile terminals now have an increased number of functions available by a user request and store a large amount of data. The data may include a photo, music, a message, and a memo. The mobile terminal organizes the data in a menu on a group basis so that a user may easily search for the data, thereby hierarchically managing the data.

It may be difficult for the user of the mobile terminal to intuitively recognize a connection between menus in the mobile terminal. That is, it may be difficult for the user of the mobile terminal to recognize a hierarchical connection between menus of different hierarchy levels, as well as menus of the same hierarchy level. Accordingly, the user of the mobile terminal may not be able to conveniently find a desired menu.

SUMMARY OF THE INVENTION

The present invention provides a mobile terminal and a method of displaying a menu thereof that hierarchically manages data by grouping the data in a menu.

Additional features of the invention will be set forth in the description which follows, and in part will be apparent from the description, or may be learned by practice of the invention.

The present invention discloses a method of displaying a menu of a mobile terminal including displaying a list of upper-level menus in an order on a display screen, displaying a first upper-level menu at an upper end of the display screen, displaying a second upper-level menu that is next to the first upper-level menu in the order at a lower end of the display screen, and lower-level menus of the first upper-level menu in a list between the first upper-level menu and the second upper-level menu in response to selection of the first upper-level menu from the list of upper-level menus, and executing a selected lower-level menu in response to selection of one of the lower-level menus.

The present invention also discloses a mobile terminal including a display unit to display a list of upper-level menus in an order on a display screen, a touch panel to detect a drag and drop motion to scroll the upper-level menus and a touch to select one of the upper-level menus, and a controller. The controller controls the display unit to display a first upper-level menu at an upper end of the display screen, a second upper-level menu that is next to the first upper-level menu in the order a lower end of the display screen, and lower-level menus of the first upper-level menu in a list between the first upper-level menu and the second upper-level menu in response to selection of the first upper-level menu from the list of upper-level menus. The controller also executes a selected lower-level menu in response to selection of one of the lower-level menus.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATED EMBODIMENTS

Figure 1:
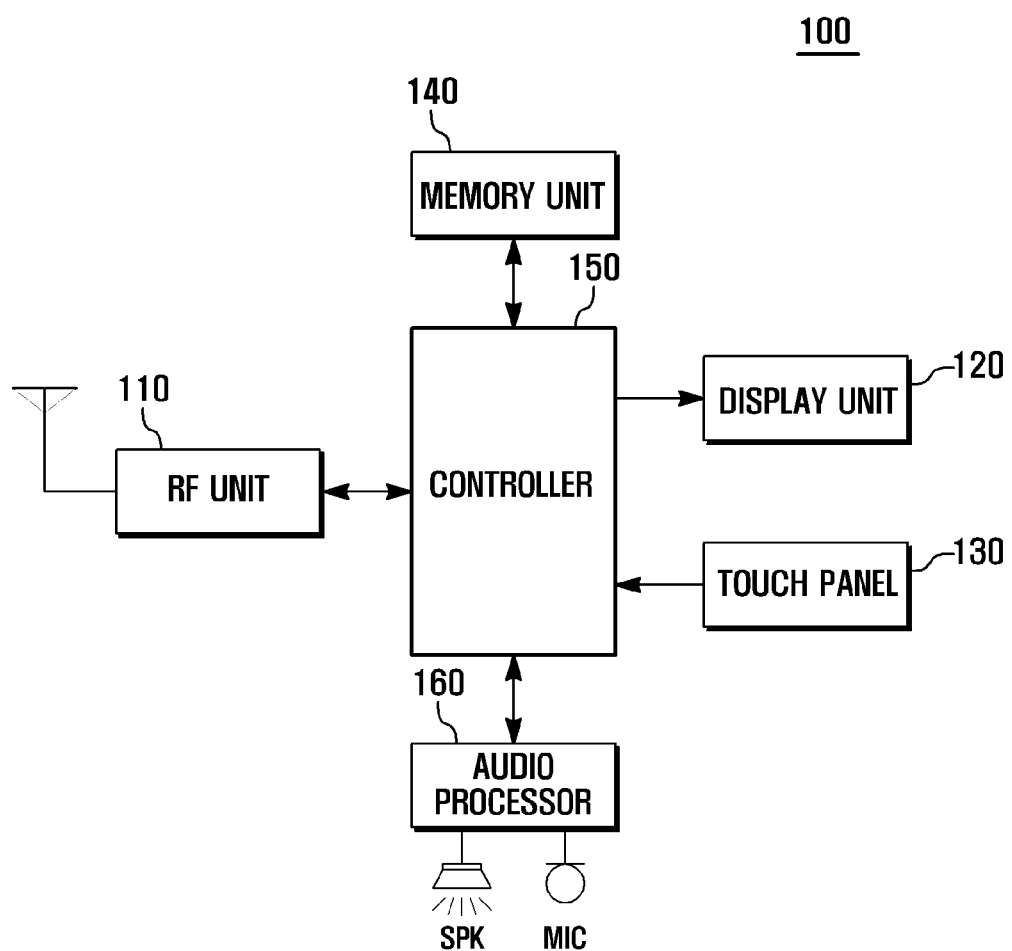
FIG. 1 is a block diagram showing a configuration of a mobile terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

In the following description, "menu" indicates an item that is provided in a mobile terminal and that can be selected by a user. In this case, the menu may be a file that includes data (for example music, a photo, a moving image, and a schedule), which may be provided by the mobile terminal. The menu may be a folder (for example a music album and a photo album) that includes at least one file, or the menu may be a function (for example a camera, alarm, and a calculator) that can be executed by the mobile terminal. The menu may be hierarchically formed. That is, the menu may be an upper-level menu corresponding to a relatively high hierarchy level (hereinafter, an "upper menu") or a lower-level menu corresponding to a relatively low hierarchy level (hereinafter, a "lower menu"). Further, the menu may not have a lower menu. When displaying a menu in the mobile terminal, menus of the same hierarchy are aligned in an order and displayed in a list. For example, the order may be determined according to a generation date, capacity, or menu name. In this case, "first menu" indicates a menu selected from menus aligned in an order, "second menu" indicates a menu positioned immediately after the first menu among the menus aligned in the order, "third menu" indicates a menu positioned immediately after the second menu among the menus aligned in the order, and "fourth menu" indicates a menu positioned immediately preceding the first menu among menus aligned in the order.

The term "touch" indicates an operation in which the user of the mobile terminal touches a finger or instrument, such as a stylus, on a touch panel. The term "drag and drop" indicates an operation in which the user removes a finger or instrument from a touch panel after moving the finger in a state where the finger is touching the touch panel. The term "drag path" indicates a path in which the user of the mobile terminal moves a finger or instrument on the touch panel.

FIG. 1 is a block diagram showing a configuration of a mobile terminal according to an exemplary embodiment of the present invention.

In the exemplary embodiment of the present invention, the mobile terminal is embodied as a mobile phone.

Referring to FIG. 1, a mobile terminal 100 includes a radio frequency (RF) unit 110, a display unit 120, a touch panel 130, a memory unit 140, a controller 150, and an audio processor 160.

The RF unit 110 performs a wireless communication function of the mobile terminal 100. The RF unit 110 includes an RF transmitter to up-convert a frequency of a signal to be transmitted and amplify the signal, and an RF receiver to low-noise amplify a received signal and down-convert a frequency of the signal.

The display unit 120 displays a state of the mobile terminal 100 on a display screen. The display unit 120 may be a liquid crystal display (LCD), and in this case, the display unit 120 includes an LCD controller, a memory to store display data, and an LCD display element.

The touch panel 130 may be mounted in the display unit 120 or may be formed separately from the display unit 120 and installed at a position spaced apart from the display unit 120. The touch panel 130 includes a touch detector and a signal converter. When a touch occurs, there is a change in the value of a physical characteristic, for example, the resistance or capacitance, which is detected by the touch detector. Further, the signal converter converts the change in the value of the physical characteristic to a touch signal.

The memory unit 140 includes a program memory and a data memory. The program memory stores operation programs of the mobile terminal 100, including a program to display a menu according to an exemplary embodiment of the present invention. The data memory stores data generated while performing a program. The memory unit 140 stores menus in a hierarchical manner.

The controller 150 controls general operations of the mobile terminal 100. The controller 150 includes a data processor having a transmitter to encode and modulate a signal to be transmitted and a receiver to demodulate and decode a received signal. The data processor may include a modem and a codec. Further, the controller 150 receives a touch signal from the signal converter to detect a touch and a drag and drop occurring on the touch panel 130.

When a touch is detected after the controller 150 displays upper menus on the display screen, the controller 150 selects an upper menu at the touch position as a first upper menu. The controller 150 controls the display unit 120 to display the first upper menu at an upper end of the display screen and to display a second upper menu at a lower end of the display screen. Further, the controller 150 controls the display unit 120 to display lower-level menus of the first upper menu in a list between the first upper menu and the second upper menu. In this case, when the controller 150 detects a drag and drop, the controller 150 scrolls through the lower menus of the first upper menu displayed between the first upper menu and the second upper menu. When a lower menu is selected, the controller 150 executes the selected lower menu.

The audio processor 160 reproduces an audio signal received from the audio codec of the data processor through a speaker SPK and outputs an audio signal generated by a microphone MIC to the audio codec of the data processor.

Figure 2A:
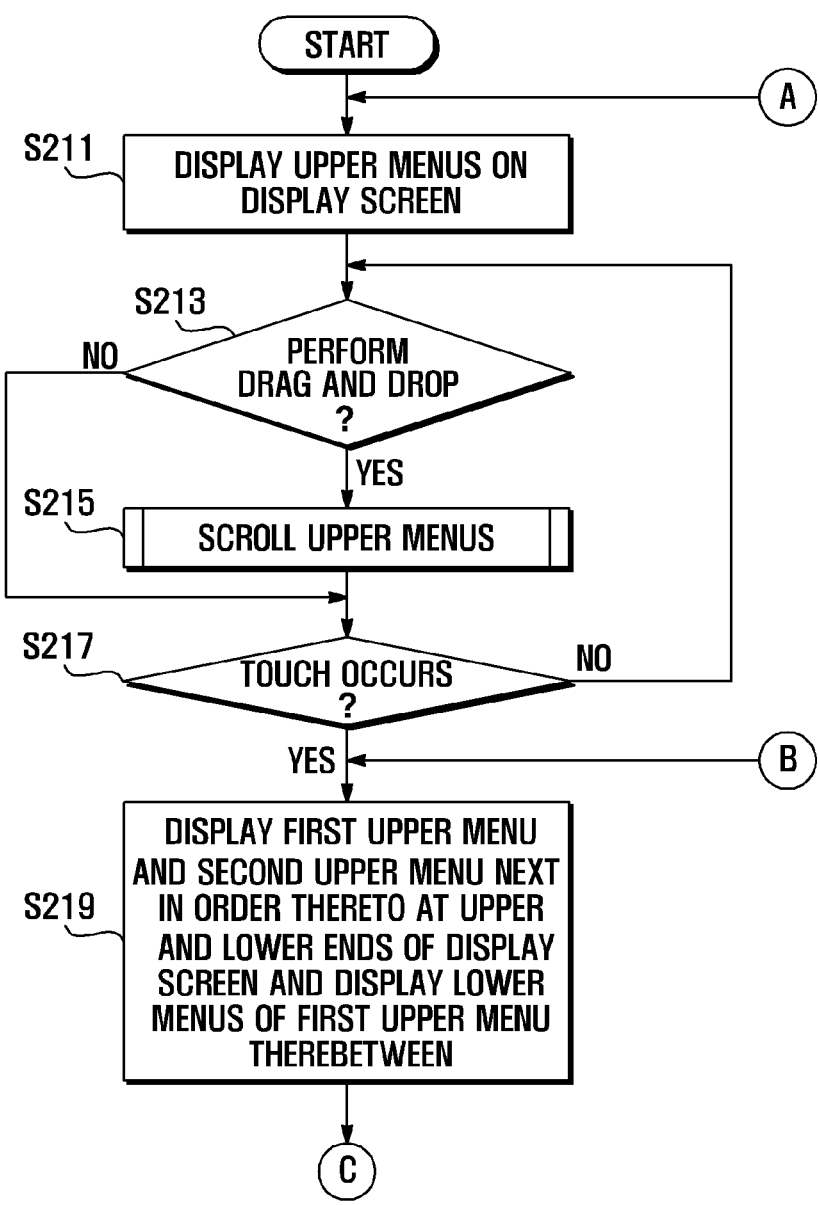
FIG. 2A and FIG. 2B are flowcharts showing a method of displaying a menu according to another exemplary embodiment of the present invention.
Figure 2B:
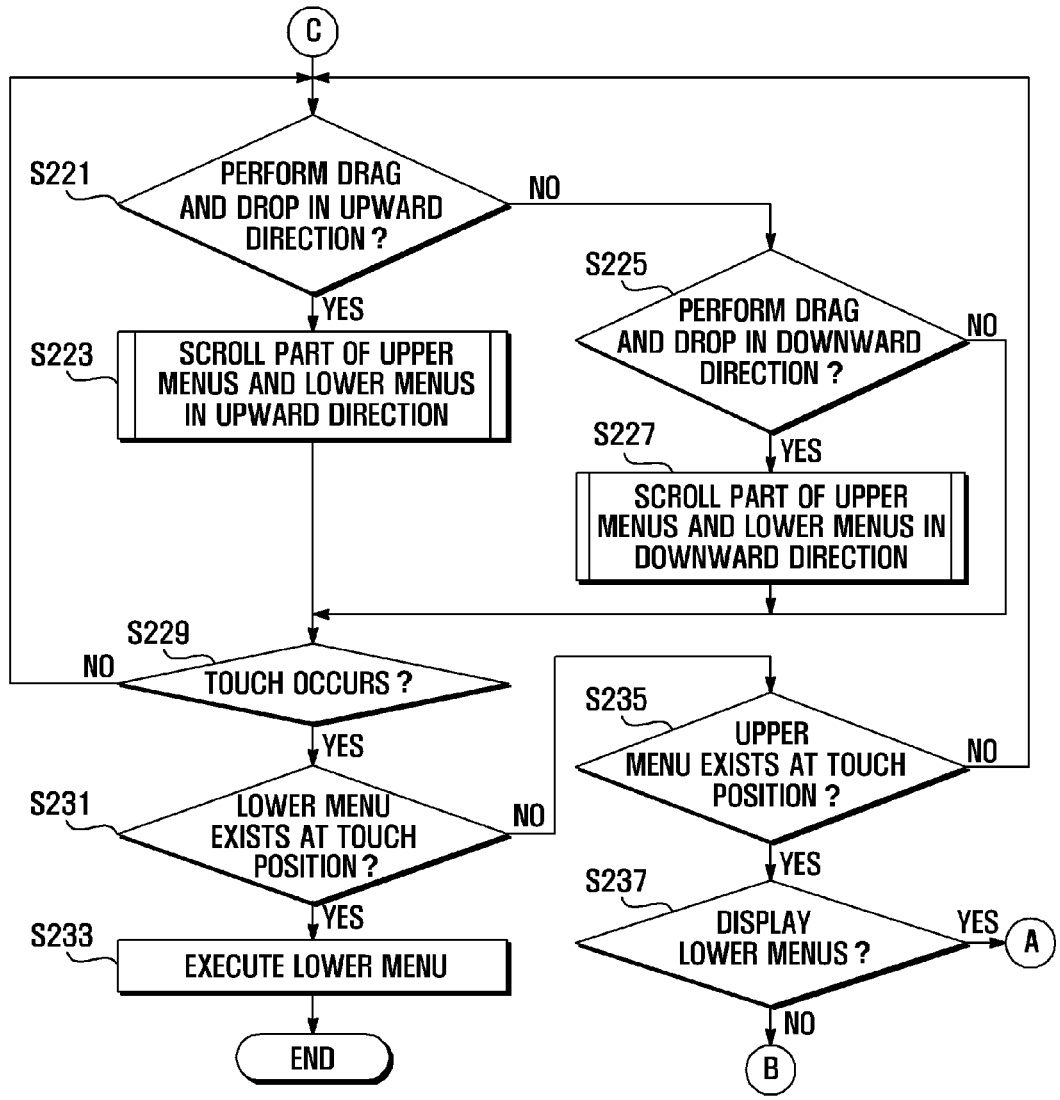
Figure 6A:
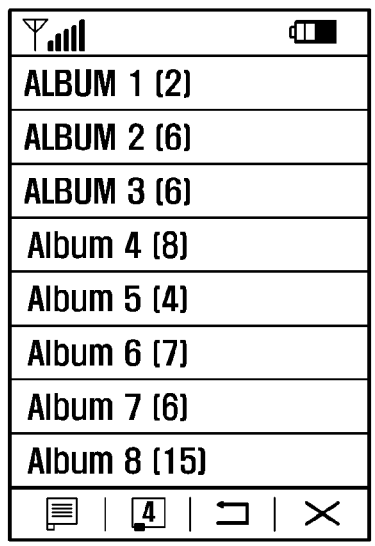
FIG. 6A, FIG. 6B, FIG. 6C, FIG. 6D, FIG. 6E, FIG. 6F, FIG. 6G, FIG. 6H, FIG. 6I, FIG. 6J, FIG. 6K, FIG. 6L, FIG. 6M, and FIG. 6N show screens displayed when performing the method of displaying a menu of FIG. 2A and FIG. 2B.
Figure 6B:
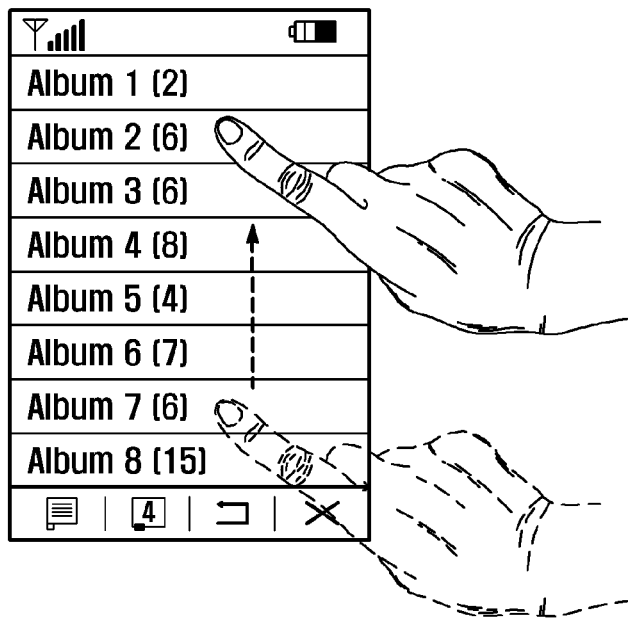
Figure 6C:
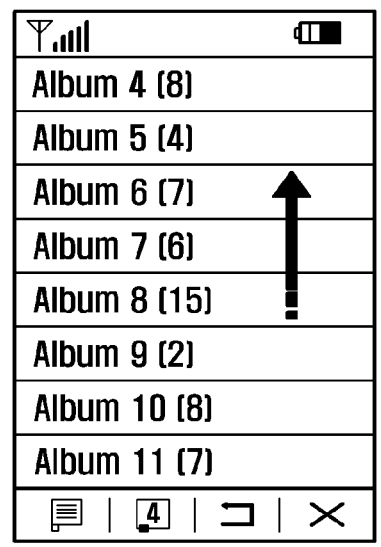
Figure 6D:
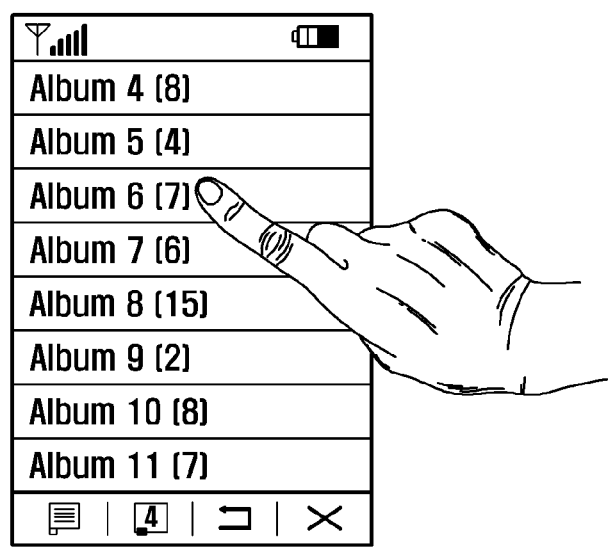
Figure 6E:

FIG. 2A and FIG. 2B are flowcharts showing a method of displaying a menu of a mobile terminal according to another exemplary embodiment of the present invention. FIG. 6A, FIG. 6B, FIG. 6C, FIG. 6D, FIG. 6E, FIG. 6F, FIG. 6G, FIG. 6H, FIG. 6I, FIG. 6J, FIG. 6K, FIG. 6L, FIG. 6M, and FIG. 6N show screens displayed when performing the method of displaying a menu of FIG. 2A and FIG. 2B. FIG. 6A shows an upper menu display screen, FIG. 6B and FIG. 6C show a display screen when scrolling an upper menu, FIGS. 6D and 6E show a display screen when selecting a specific upper menu, FIG. 6F, FIG. 6G, FIG. 6H, FIG. 6I, FIG. 6J, FIG. 6K, FIG. 6L, and FIG. 6M show a display screen when scrolling an upper menu and a lower menu, and FIG. 6N shows a display screen when re-selecting the selected upper menu. In the present exemplary embodiment, a lower menu is exemplified as a music file, and an upper menu is exemplified as an album including at least one music file, however this is only for the purpose of simplifying the description, and an upper menu and a lower menu are not limited thereto.

Referring to FIG. 2A, the controller 150 controls the display unit 120 to display upper menus in a list on a display screen (S211), as shown in FIG. 6A. In this case, the controller 150 controls the display unit 120 to display a preset quantity of upper menus on the display screen. If the quantity of upper menus is equal to or greater than the preset quantity, the controller 150 controls the display unit 120 to display the preset quantity of upper menus in a list. If the quantity of upper menus is less than the preset quantity, the controller 150 controls the display unit 120 to display all of the upper menus in a list and to leave the remaining space empty.

The controller 150 determines whether a drag and drop is performed on the touch panel 130 (S213), as shown in FIG. 6B.

If a drag and drop is performed on the touch panel 130, the controller 150 scrolls the upper menus (S215), as shown in FIG. 6C. If upper menus exist that are not displayed on the display screen, the controller 150 scrolls the remaining undisplayed upper menus and controls the display unit 120 to display the remaining upper menus on the display screen. In order to determine a scroll direction, the controller 150 analyzes a drag path and scrolls the upper menus according to a drag direction.

The process of step S215, in which the controller 150 scrolls the upper menus, is described in more detail with reference to FIG. 3.

Figure 3:
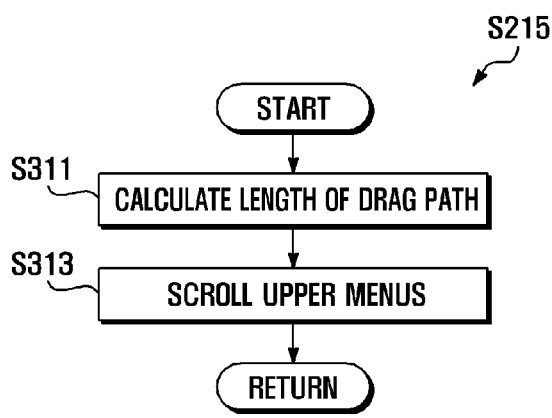
FIG. 3 is a flowchart showing a process of scrolling upper menus in the method of FIG. 2A and FIG. 2B.

FIG. 3 is a flowchart showing the process of step S215 of scrolling the upper menus in the method of FIG. 2A.

Referring to FIG. 3, when a drag and drop is detected, the controller 150 calculates a length of a drag path (S311).

The controller 150 scrolls upper menus (S313). In this case, the controller 150 scrolls a quantity of upper menus corresponding to the length of the drag path. The controller 150 scrolls the upper menus at a speed corresponding to a speed of the drag and drop.

The process then continues at step S217 of FIG. 2A.

The controller 150 determines whether a touch occurs on the touch panel 130 (S217), as shown in FIG. 6D.

If a touch occurs on the touch panel 130, the controller 150 controls the display unit 120 to display an upper menu positioned at the touch position as a first upper menu and to display a lower menu of the first upper menu (S219), as shown in FIG. 6E. That is, the controller 150 selects the first upper menu according to the touch position and the display unit 120 displays the first upper menu at the upper end of the display screen. The controller 150 controls the display unit 120 to display the second upper menu at the lower end of the display screen. Further, the controller 150 controls the display unit 120 to display lower menus of the first upper menu between the first upper menu and the second upper menu. In this case, the controller 150 controls the display unit 120 to display upper menus and lower menus within the preset quantity on the display screen.

If the quantity of menus including the lower menus, the first upper menu, and the second upper menu displayed on the display screen is less than the preset quantity, the controller 150 controls the display unit 120 to display further upper menus in the remaining space. That is, the controller 150 controls the display unit 120 to display the second upper menu at a position immediately below the lowermost lower menu of the first upper menu, and to display further upper menus in the order of the list at positions below the second upper menu. Alternatively, the controller 150 may control the display unit 120 to display the first upper menu immediately above an uppermost lower menu of the first upper menu and to display upper menus preceding the first upper menu in the order at positions above the first upper menu.

Figure 6F:
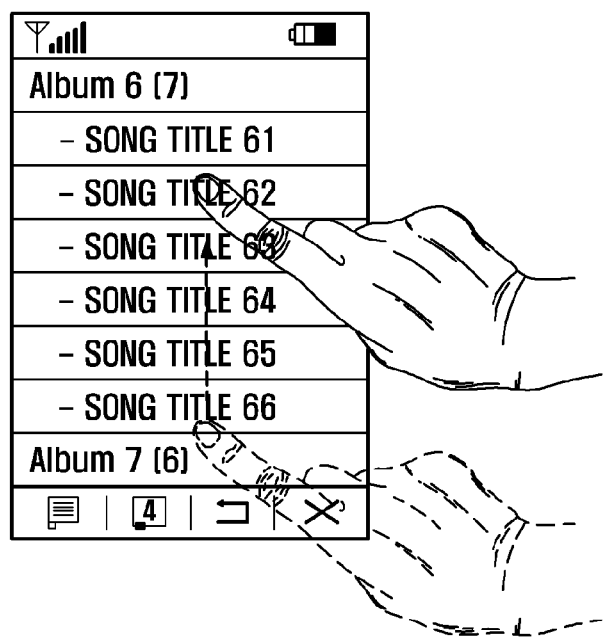

The controller 150 determines whether a drag and drop is performed in an upward direction (S221), as shown in FIG. 6F.

Figure 6G:
Figure 6H:
Figure 6I:
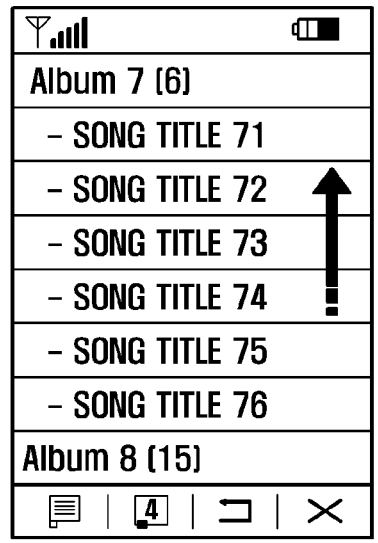

If a drag and drop is performed in an upward direction, the controller 150 scrolls the upper menus and the lower menus in an upward direction (S223), as shown in FIG. 6G, FIG. 6H, and FIG. 6I. That is, if lower menus of the first upper menu that are not displayed on the display screen exist, the controller 150 scrolls the remaining undisplayed lower menus and the display unit 120 displays the remaining lower menus on the display screen. In this case, the controller 150 analyzes a drag path and determines a scroll direction. The controller 150 scrolls according to the drag direction at a speed corresponding to a speed of the drag and drop.

The process of step S223, in which the controller 150 scrolls the upper menus and the lower menus in an upward direction, is described in more detail with reference to FIG. 4.

Figure 4:
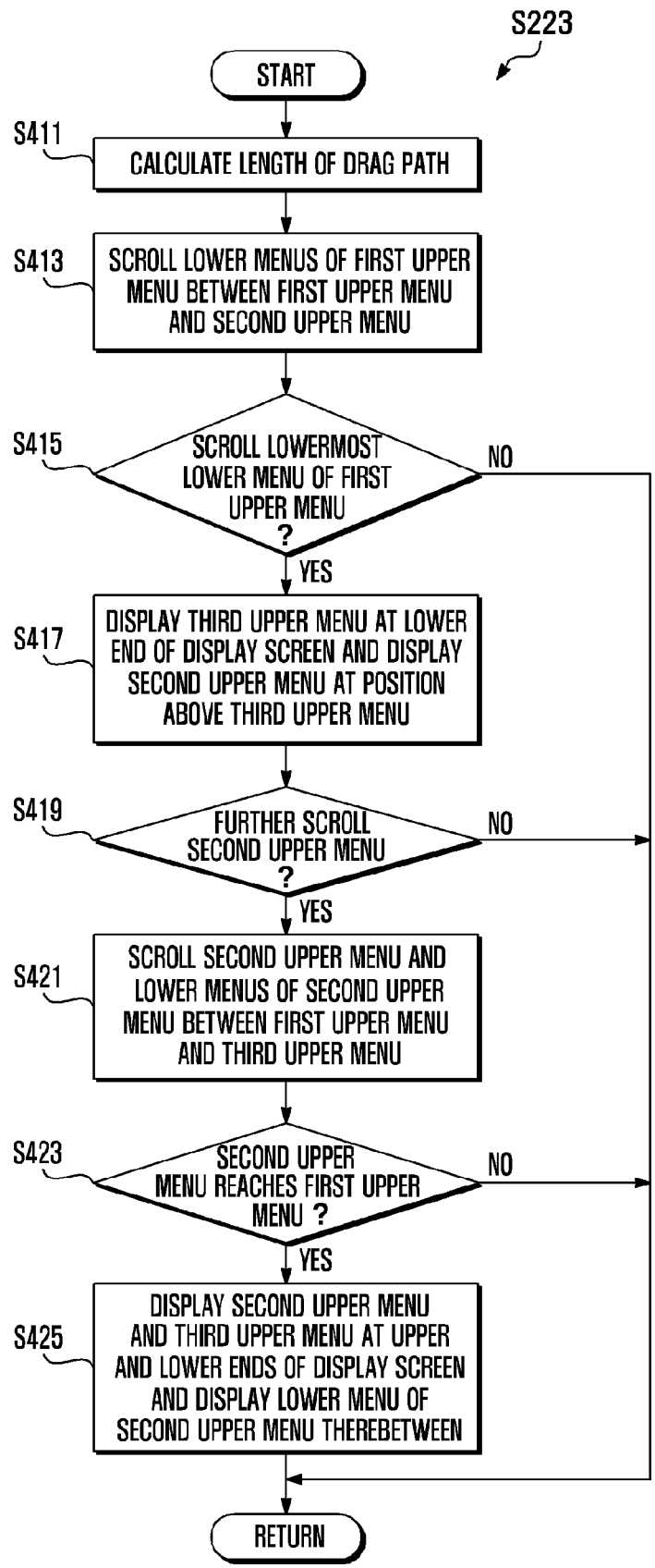
FIG. 4 is a flowchart showing a process of scrolling upper menus and lower menus in an upward direction in the method of FIG. 2A and FIG. 2B.

FIG. 4 is a flowchart showing the process of step S223 of scrolling the upper menus and the lower menus in an upward direction in the method of FIG. 2B.

Referring to FIG. 4, when a drag and drop in an upward direction is detected at step S221, the controller 150 calculates a length of a drag path (S411).

The controller 150 scrolls lower menus of the first upper menu that are displayed between the first upper menu and the second upper menu (S413).

The controller 150 determines whether a lowermost lower menu of the first upper menu is to be scrolled (S415).

If a lowermost lower menu of the first upper menu is to be scrolled, the controller 150 controls the display unit 120 to display a third upper menu at the lower end of the display screen (S417), as shown in FIG. 6G. The controller 150 controls the display unit 120 to display the second upper menu at a position immediately above the third upper menu.

The controller 150 determines whether the second upper menu is to be further scrolled (S419).

If the second upper menu is to be further scrolled, the controller 150 scrolls the second upper menu and lower menus of the second upper menu between the lowermost lower menu of the first upper menu and the third upper menu (S421), as shown in FIG. 6H.

The controller 150 determines whether the second upper menu reaches the first upper menu (S423).

If the second upper menu reaches the first upper menu, the controller 150 controls the display unit 120 to display the second upper menu at the upper end of the display screen, to display the third upper menu at the lower end of the display screen, and to display lower menus of the second upper menu between the second upper menu and the third upper menu (S425), as shown in FIG. 6I.

The process then continues at step S229 of FIG. 2B.

When the second upper menu reaches the first upper menu, the second upper menu may be regarded as the first upper menu, and the third upper menu may be regarded as the second upper menu. That is, when the second upper menu reaches the upper end of the display screen, the second upper menu is changed to the first upper menu and the third upper menu is changed to the second upper menu.

Figure 6J:
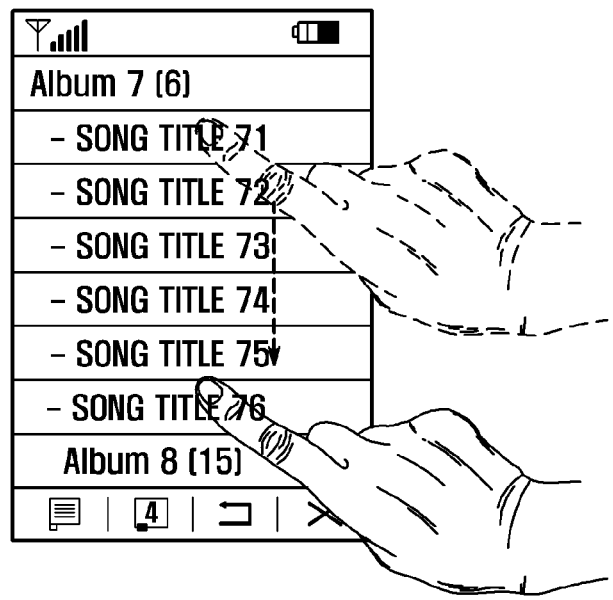

Returning to step S221 of FIG. 2B, if a drag and drop is not performed in an upward direction, the controller 150 determines whether a drag and drop is performed in a downward direction (S225), as shown in FIG. 6J.

Figure 6K:
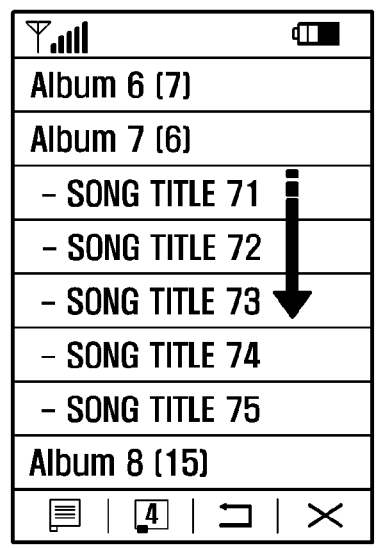
Figure 6L:
Figure 6M:
Figure 6N:
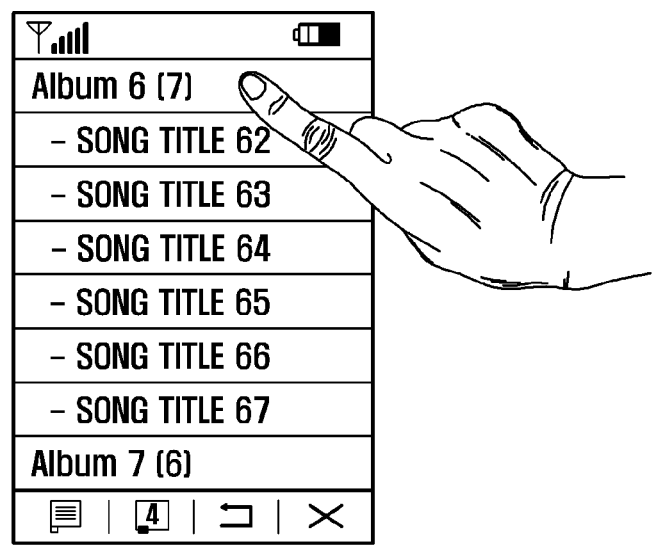

If a drag and drop is performed in a downward direction, the controller 150 scrolls the upper menus and the lower menus in a downward direction (S227), as shown in FIG. 6K, FIG. 6L, and FIG. 6M.

The controller 150 analyzes a drag path and determines a scroll direction. The controller 150 scrolls according to the drag direction at a speed corresponding to a speed of the drag and drop.

The process of step S227 in which the controller 150 scrolls the upper menus and the lower menus in a downward direction is described in more detail with reference to FIG. 5.

Figure 5:
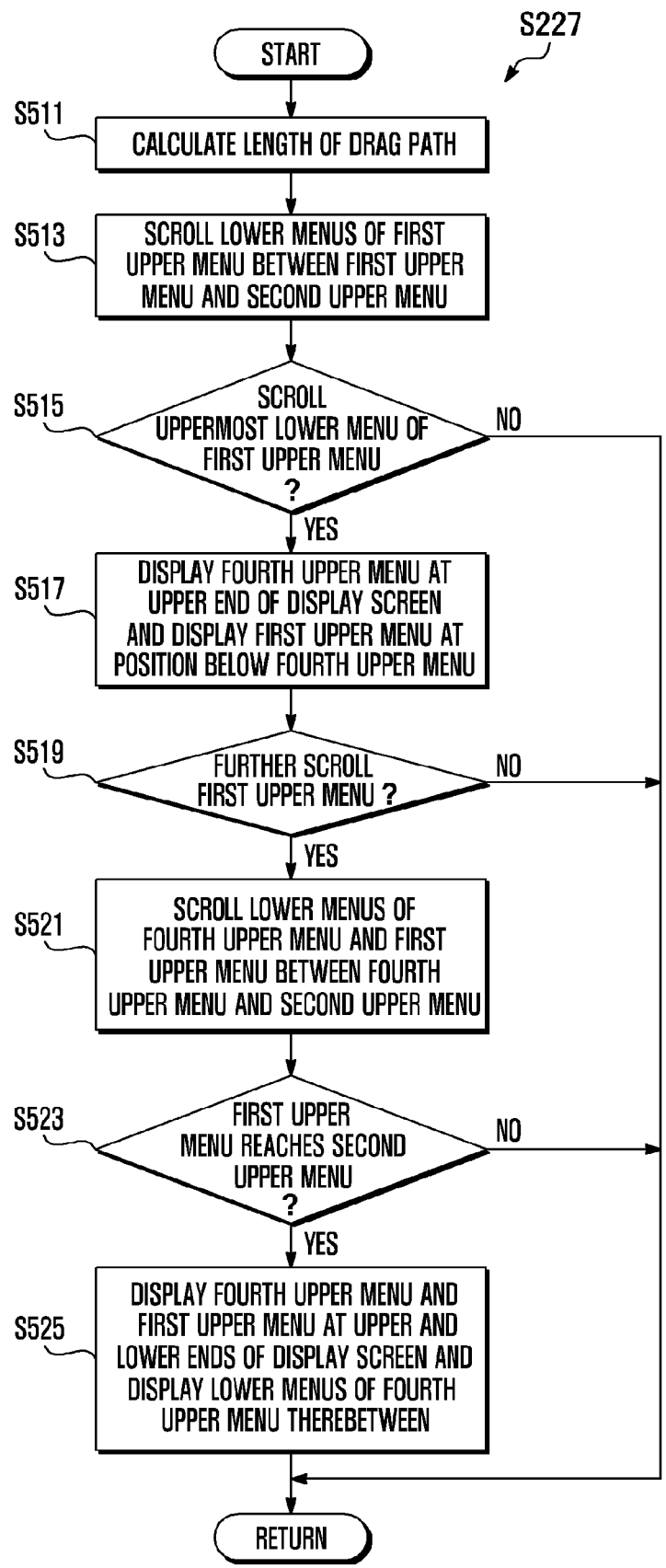
FIG. 5 is a flowchart showing a process of scrolling upper menus and lower menus in a downward direction in the method of FIG. 2 and FIG. 2B.

FIG. 5 is a flowchart showing the process of step S227 of scrolling upper menus and lower menus in a downward direction in the method of FIG. 2B.

Referring to FIG. 5, when a drag and drop in a downward direction is detected at step S225, the controller 150 calculates a length of a drag path (S511).

The controller 150 scrolls lower menus of the first upper menu between the first upper menu and the second upper menu (S513).

The controller 150 determines whether an uppermost lower menu of the first upper menu is to be scrolled (S515).

If an uppermost lower menu of the first upper menu is to be scrolled, the controller 150 controls a display unit 120 to display a fourth upper menu at the upper end of the display screen (S517), as shown in FIG. 6K. The controller 150 controls the display unit 120 to display the first upper menu at a position immediately below the fourth upper menu.

The controller 150 determines whether the first upper menu is to be scrolled (S519).

If the first upper menu is to be scrolled, the controller 150 scrolls lower menus of the fourth upper menu and lower menus of the first upper menu between the fourth upper menu and the second upper menu (S521), as shown in FIG. 6L.

The controller 150 determines whether the first upper menu reaches the second upper menu (S523).

If the first upper menu reaches the second upper menu, the controller 150 controls the display unit 120 to display the first upper menu at the lower end of the display screen, to display the fourth upper menu at the upper end of the display screen, and to display lower menus of the fourth upper menu between the fourth upper menu and the first upper menu (S525), as shown in FIG. 6M.

The process then continues at step S229 of FIG. 2B.

When the first upper menu reaches the second upper menu, the first upper menu may be regarded as the second upper menu, and the fourth upper menu may be regarded as the first upper menu. That is, when the first upper menu reaches the lower end of the display screen, the first upper menu is changed to the second upper menu and the fourth upper menu is changed to the first upper menu.

Returning to FIG. 2B, the controller 150 determines whether a touch occurs on the touch panel 130 (S229), as shown in FIG. 6N.

If a touch occurs on the touch panel 130, the controller 150 determines whether a lower menu exists at the touch position (S231).

If a lower menu exists at the touch position, the controller 150 executes the lower menu (S233) and the menus are no longer displayed.

If a lower menu does not exist at the touch position, the controller 150 determines whether an upper menu exists at the touch position (S235).

If an upper menu exists at the touch position, the controller 150 determines whether lower menus of the upper menu are already displayed (S237).

If lower menus of the upper menu are already displayed, the process returns to step S211 and the controller 150 controls the display unit 120 to display upper menus in a list on the display screen.

If lower menus of the upper menu are not already displayed, the process returns to step S219 and the controller 150 controls the display unit 120 to display the lower menus of the first upper menus between the first upper menus and the second upper menus.

As described above, according to exemplary embodiments of the present invention, when the mobile terminal displays upper menus in a list, if a specific upper menu is selected, the mobile terminal displays the selected upper menu, an upper menu next in order of the list, and lower menus of the selected upper menu on a screen. When a scroll is performed, the mobile terminal scrolls the lower menus between the selected upper menu and the upper menu next in order. Thereby, a user of the mobile terminal may easily recognize a hierarchical connection between an upper menu and lower menus as well as neighboring upper menus. That is, the user of the mobile terminal may intuitively recognize a connection between menus. Accordingly, the user of the mobile terminal may conveniently find a desired menu.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of displaying a menu of a mobile terminal, comprising:

displaying a list of upper-level menus in an order on a display screen;

displaying a first upper-level menu at an upper section of the display screen, a second upper-level menu that is next to the first upper-level menu in the order at a lower section of the display screen, and lower-level menus of the first upper-level menu in a list between the first upper-level menu and the second upper-level menu in response to selection of the first upper-level menu from the list of upper-level menus;

scrolling the lower-level menus of the first upper-level menu in response to detecting a drag motion on at least one of the lower-level menus, wherein neither the first upper-level menu nor the second upper-level menu is scrolled during the scrolling of the lower-level menus;

scrolling the second upper-level menu in an upward direction and displaying a third upper-level menu that is next to the second upper-level menu in the order at the lower section of the display screen in response to a lowermost lower-level menu among the lower-level menus of the first upper-level menu being scrolled in the upward direction;

scrolling lower-level menus of the second upper-level menu in an upward direction between the second upper-level menu and the third upper-level menu in response to the second upper-level menu being further scrolled in the upward direction; and executing a selected lower-level menu in response to selection of one of the lower-level menus.

2. The method of claim 1, further comprising:

scrolling the lower-level menus of the first upper-level menu in between the first upper-level menu and the second upper-level menu held at the upper section and the lower section, respectively.

3. The method of claim 1, further comprising:

displaying lower-level menus of the second upper-level menu in a list between the second upper-level menu and the third upper-level menu in response to the lower-level menus of the second upper-level menu being scrolled in the upward direction and the second upper-level menu being scrolled to the upper section of the display screen.

4. The method of claim 2, further comprising:

scrolling the first upper-level menu in a downward direction and displaying a fourth upper-level menu preceding the first upper-level menu in the order at the upper section of the display screen in response to an uppermost lower-level menu among the lower-level menus of the first upper-level menu being scrolled in the downward direction.

5. The method of claim 4, further comprising:

scrolling lower-level menus of the fourth upper-level menu in a downward direction between the fourth upper-level menu and the first upper-level menu in response to the first upper-level menu being further scrolled in the downward direction.

6. The method of claim 5, further comprising:

displaying the lower-level menus of the fourth upper-level menu in a list between the fourth upper-level menu and the first upper-level menu in response to the lower-level menus of the fourth upper-level menu being scrolled in the downward direction and the first upper-level menu being scrolled to the lower section of the display screen.

7. The method of claim 1, further comprising:

displaying additional upper-level menus below the second upper-level menu in response to determining that a quantity of menus including the lower-level menus, the first upper-level menu, and the second upper-level menu displayed on the display screen is less than a set quantity.

8. A mobile terminal, comprising:
a display unit configured to display a list of upper-level menus in an order on a display screen;
a touch panel configured to detect a drag and drop motion to scroll the upper-level menus and a touch to select one of the upper-level menus; and
a controller configured to control the display unit to display a first upper-level menu at an upper section of the display screen, a second upper-level menu that is next to the first upper-level menu in the order at a lower section of the display screen, and lower-level menus of the first upper-level menu in a list between the first upper-level menu and the second upper-level menu in response to selection of the first upper-level menu from the list of upper-level menus, and to execute a selected lower-level menu in response to selection of one of the lower-level menus,
wherein the controller is further configured to scroll the lower-level menus of the first upper-level menu in response to detecting a drag motion on at least one of the lower-level menus, neither the first upper-level menu nor the second upper-level menu being scrolled during scrolling of the lower-level menus,
wherein the controller is further configured to scroll the second upper-level menu in an upward direction and control the display unit to display a third upper-level menu that is next to the second upper-level menu in the order at the lower section of the display screen in response to a lowermost lower-level menu among the lower-level menus of the first upper-level menu being scrolled in the upward direction, and
wherein the controller is further configured to scroll lower-level menus of the second upper-level menu in an upward direction between the second upper-level menu and the third upper-level menu in response to the second upper-level menu being further scrolled in the upward direction.

9. The mobile terminal of claim 8, wherein the controller is further configured to scroll the lower-level menus of the first upper-level menu in between the first upper-level menu and the second upper-level menu held at the upper section and the lower section, respectively.

10. The mobile terminal of claim 9, wherein the controller is further configured to control the display unit to display lower-level menus of the second upper-level menu in a list between the second upper-level menu and the third upper-level menu in response to the second upper-level menu being scrolled in an upward direction to reach the upper section of the display screen.

11. The mobile terminal of claim 9, wherein the controller is further configured to scroll a fourth upper-level menu preceding the first upper-level menu in the order at the upper section of the display screen in response to an uppermost lower level menu among the lower level menus of the first upper-level menu being scrolled in the downward direction.

12. The mobile terminal of claim 11, wherein the controller is further configured to scroll lower-level menus of the fourth upper-level menu in a downward direction between the fourth upper-level menu and the first upper-level menu in response to the first upper-level menu being further scrolled in the downward direction.

13. The mobile terminal of claim 12, wherein the controller is further configured to control the display unit to display lower-level menus of the fourth upper-level menu in a list between the fourth upper-level menu and the first upper-level menu in response to the first upper-level menu being scrolled to the lower section of the display screen while scrolling the lower-level menus of the fourth upper-level menu in the downward direction.

14. The mobile terminal of claim 8, wherein the controller is further configured to control the display unit to display additional upper-level menus below the second upper-level menu in response to determining a quantity of menus including the lower-level menus, the first upper-level menu, and the second upper-level menu displayed on the display screen is less than a set quantity.

15. A method, comprising:
displaying a first upper-level menu on a display screen associated with a mobile terminal, the first upper-level menu being associated with a plurality of lower-level menus;
displaying a second upper-level menu in hierarchical association with the first upper-level menu;
displaying at least some of the plurality of lower-level menus between the first upper-level menu and the second upper-level menu, wherein at least one lower level-menu of the plurality of lower-level menus is not displayed, but navigably available;
detecting a drag motion associated with at least one displayed lower-level menu; scrolling the plurality of lower-level menus in response to the drag motion, wherein neither the first upper-level menu nor the second upper-level menu is scrolled until after the at least one lower-level menu is displayed;
scrolling, after the at least one lower-level menu is displayed, the second upper-level menu in an upward direction and displaying a third upper-level menu at the lower section of the display screen; and
scrolling lower-level menus of the second upper-level menu in an upward direction between the second upper-level menu and the third upper-level menu in response to the second upper-level menu being further scrolled in the upward direction.

16. The method of claim 15, further comprising:
terminating display of at least one displayed lower-level menu,
wherein neither the first upper-level menu nor the second upper-level menu is scrolled until also after the at least one displayed lower-level menu is not displayed.

* * * * *